UNITED STATES PATENT OFFICE.

JONATHAN WARD, OF EAST HARDWICK, VERMONT.

IMPROVED MEDICAL COMPOUND.

Specification forming part of Letters Patent No. 42,704, dated May 10, 1864.

*To all whom it may concern:*

Be it known that I, JONATHAN WARD, of East Hardwick, county of Caledonia, and State of Vermont, have invented a new and original compound which has proved an invaluable and positive cure for all the diseases of the kidneys by compounding a certain number of vegetable extracts, simple in themselves, but powerful and sure as a remedy when compounded, in curing the above-named diseases, of which the following is a specification.

My vegetable kidney compound is made up of four distinct vegetable extracts. The names and proportions of each and manner of putting them together are as follows: I put into a glass bottle of convenient size two quarts of alcohol. I then add three ounces of oil of checkerberry, one ounce of oil of juniper, one ounce of extract of dandelion, one ounce of extract of pipsissewa, one ounce extract of mandrake, one ounce of extract of logwood, one ounce of extract of scorched sugar. After shaking and giving the above sufficient time to settle I turn it off from the sediment for use, fully prepared.

The above-named compound is designed exclusively for the cure of the various diseases of the kidneys, and is for inward application only. The amount to be taken for each dose is ten to twenty drops five times each day.

Believing myself to be the original inventor of the above-named compound, I therefore claim it in all its parts and proportions fully prepared in the manner above specified.

JONATHAN WARD.

Witnesses:
J. TORREY, Jr.,
J. H. GEOZ.